INVENTORS
A. J. Schaldach
U. A. Blackburn

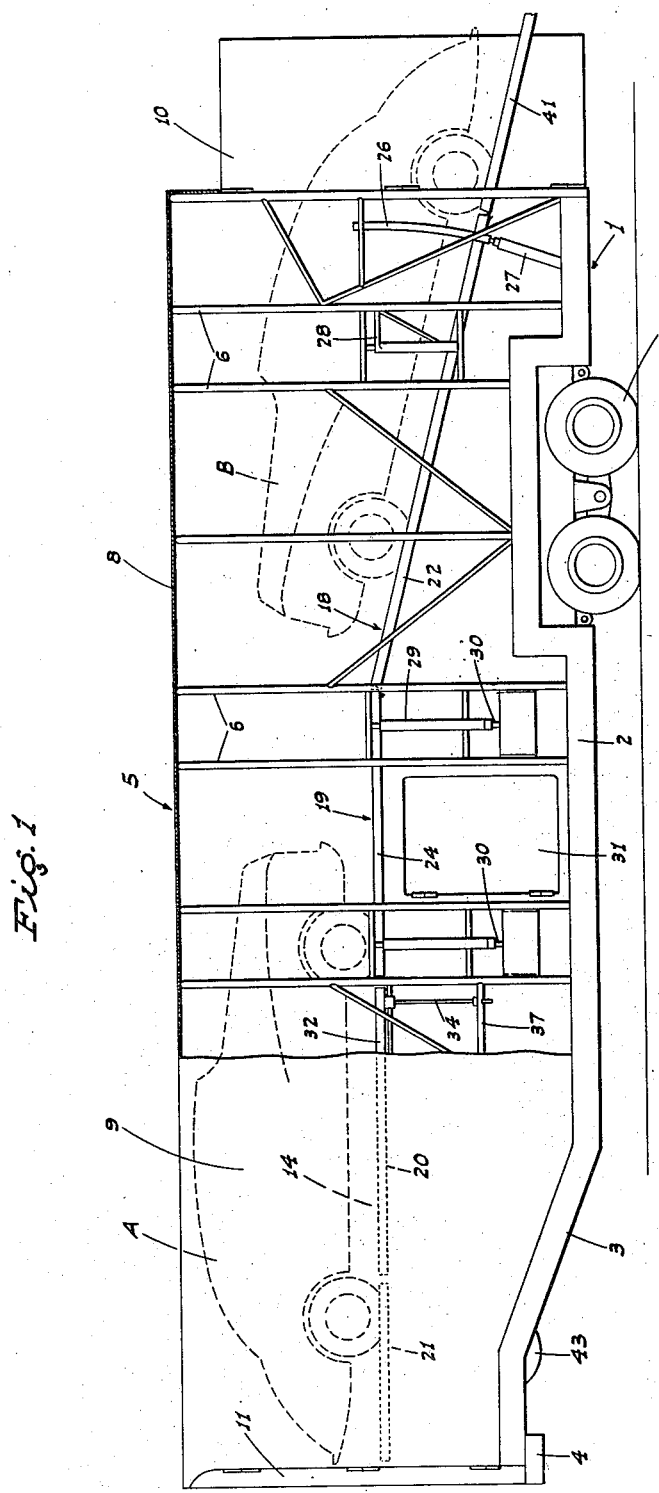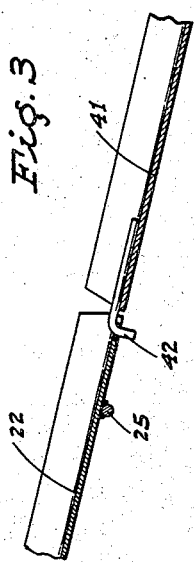

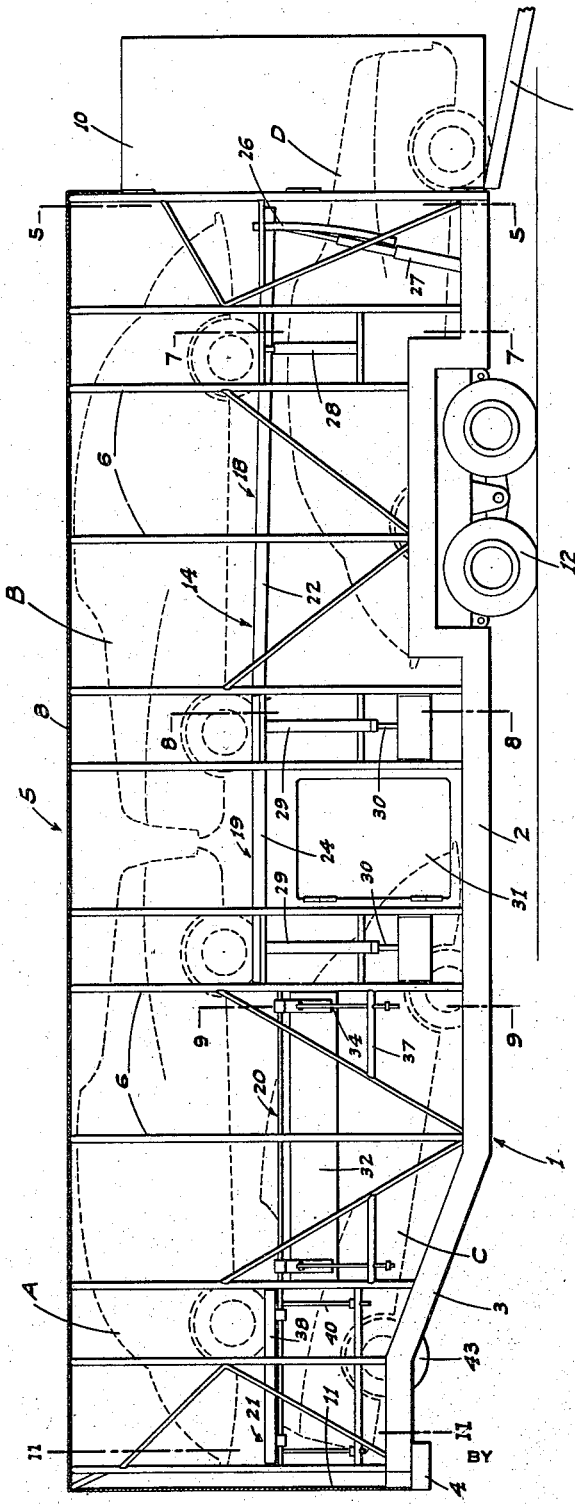
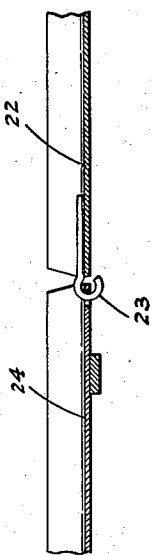

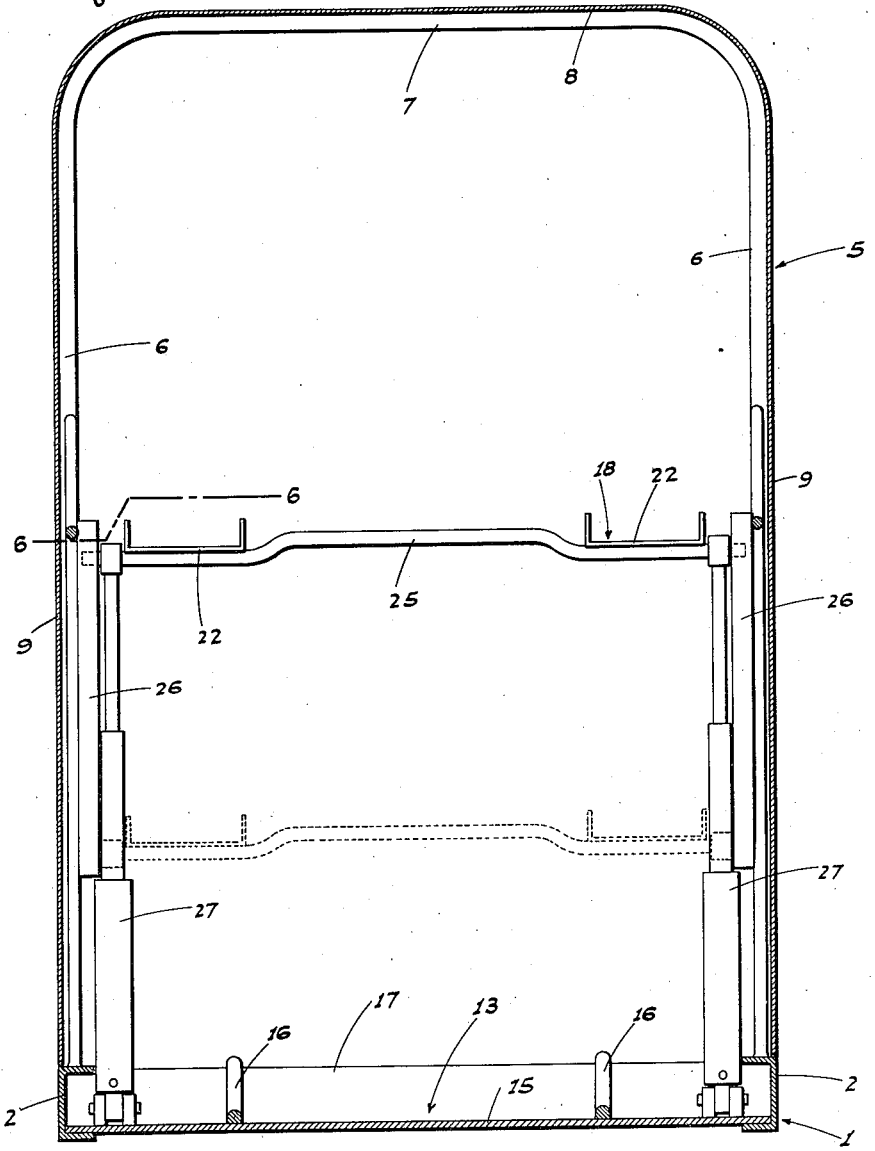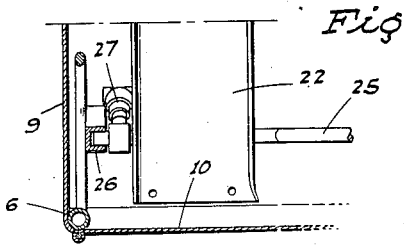

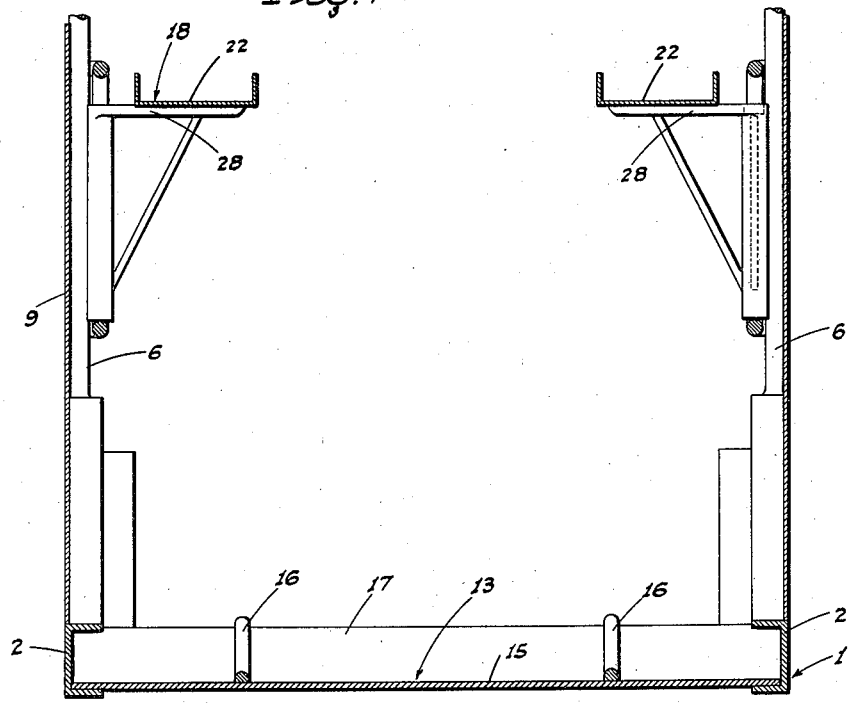
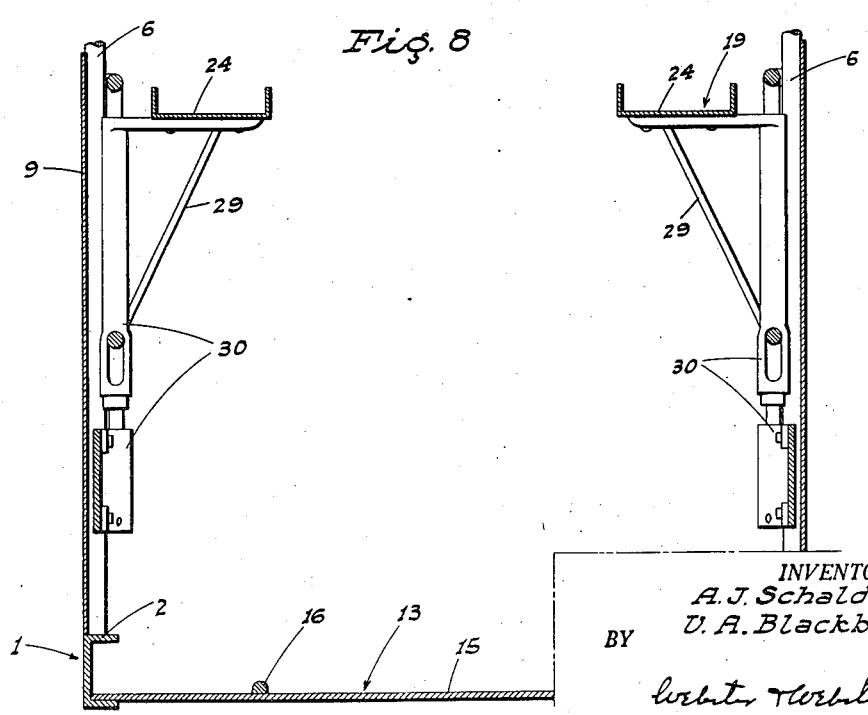

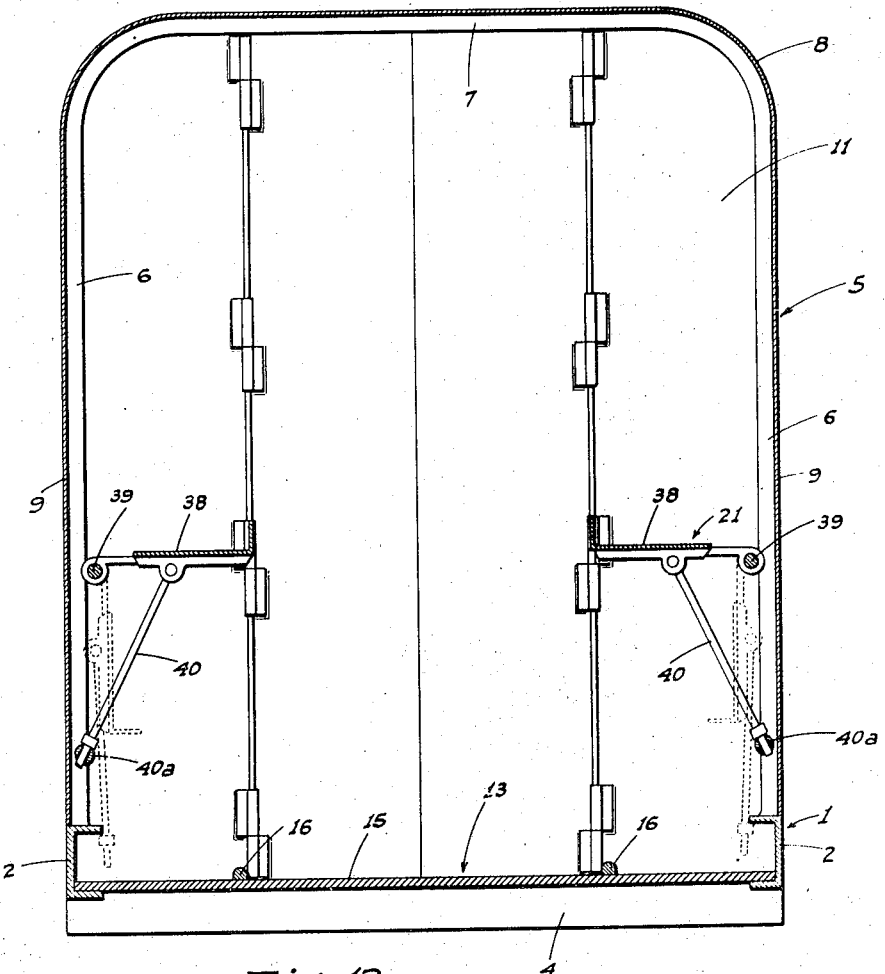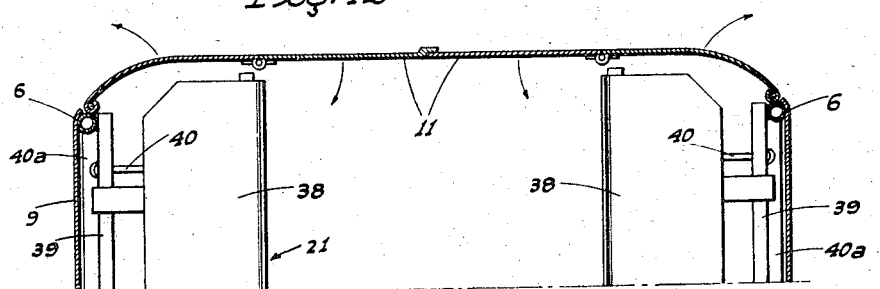

Patented Feb. 15, 1949

2,461,927

UNITED STATES PATENT OFFICE 2,461,927

AUTOMOBILE TRANSPORT VAN

Alvin J. Schaldach and Virgil A. Blackburn, Sacramento, Calif.

Application January 10, 1947, Serial No. 721,250

3 Claims. (Cl. 296—1)

This invention is directed to, and it is an object to provide, an improved automobile transport van especially designed for the delivery of new automobiles from the factory to dealers; the van being arranged so that four automobiles may be transported as a load, all within a protective enclosure to maintain such automobiles clean.

Another object of the invention is to provide an automobile transport van which includes, within an enclosed body, a lower deck and an upper deck, both adapted to receive a pair of automobiles in end to end relation; the upper deck being of novel adjustable construction whereby the double-decked van can be loaded readily and without employing an excessively high topped body. With the present deck construction, the overall height of the van is not greater than allowed by law.

A further object of the invention is to provide an auto transport van in the form of a trailer adapted to couple to a truck van in trailing relation; the trailer van loading from the rear end and having front end doors so that automobiles from the trailer van may be loaded into the truck van by transfer between adjacent ends thereof.

A further object of the invention is to provide a practical transport van, and one which will be exceedingly effective for the purpose for which it is designed.

These objects are accomplished by means of such structure and relative arrangement of parts as will fully appear by a perusal of the following specification and claims.

In the drawings:

Fig. 1 is a longitudinal or elevational outline of the automobile transport van, with the near side panel removed, illustrating the manner of loading the upper deck.

Fig. 2 is a similar view, but illustrates the manner of loading the lower deck.

Fig. 3 is a fragmentary sectional elevation illustrating the manner of connection of the detachable loading ramps, with the rear runway section when the latter is lowered to loading position.

Fig. 4 is a fragmentary sectional elevation illustrating the eye type hinge connection between the front end of the rear runway section and the adjacent end of the intermediate runway section of the upper deck.

Fig. 5 is an enlarged cross section of the van on line 5—5 of Fig. 2.

Fig. 6 is a fragmentary sectional plan on line 6—6 of Fig. 5.

Fig. 7 is a cross section on line 7—7 of Fig. 2.

Fig. 8 is a cross section on line 8—8 of Fig. 2.

Fig. 11 is a cross section on line 11—11 of Fig. 2.

Fig. 12 is a fragmentary sectional plan view of the front end of the van illustrating particularly the folding front end doors.

Figure 9:
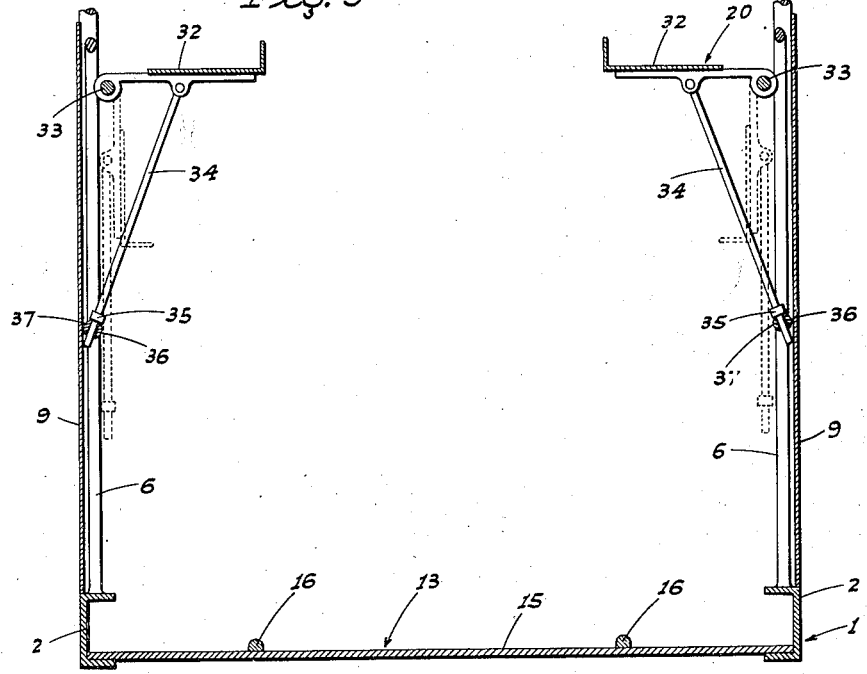
Fig. 9 is a cross section on line 9—9 of Fig. 2.

Referring now more particularly to the characters of reference on the drawings, the improved automobile transport van includes an elongated main frame, indicated generally at 1, which includes transversely spaced, longitudinally extending side beams 2 of channel configuration disposed in facing relation. The main frame 1 includes, at its forward end, an upwardly offset portion 3 having a fifth wheel part 4 adapted for cooperative engagement with a similar part on the rear end of a truck (not shown).

The elongated main frame 1 is provided with an enclosed or van body, indicated generally at 5, and said van body includes upstanding, longitudinally extending side frames 6 of skeleton construction, as shown. The side frames 6 are connected together by top bars 7, and the van is enclosed by a top cover 8 and side panels 9. Access to the van body 5 is provided, at the rear of the latter, by means of hinged rear doors 10. For the purpose hereinafter described, the van body is fitted with hinged front doors 11, which are of folding type, whereby they may be opened without undue forward projection.

Adjacent its rear ends the elongated main frame 1 is supported by transversely spaced dual wheel trucks 12 carried on a suitable axle assembly.

Within the van body 5 the same is provided with a lower deck, indicated generally at 13, and an upper deck, indicated generally at 14; each deck being adapted to receive, in transport relation, a pair of automobiles disposed in end to end relation.

The lower deck 13 is comprised of a floor plate 15 which extends full length of the main frame 1 between the longitudinal side beams 2, being supported, along opposite edges, by the latter. Longitudinal guide rods 16, fixed on the floor plate 15, define the runways for the automobiles on the lower deck; the floor plate 15 being humped slightly, as at 17, over the axle structure (not shown) which carries the dual wheel trucks 12.

The upper deck 14 comprises a rear runway section, indicated generally at 18; an intermediate runway section, indicated generally at 19; a drop runway section, indicated generally at 20; and a front runway section, indicated generally at 21.

The rear runway section 18 comprises a pair of longitudinally extending, transversely spaced runways 22 hinged, at their forward ends, by eye-type hinges 23 to the rear ends of corresponding runways 24 which the intermediate runway section includes. The runways 22 are connected together, for vertical swinging adjustment, by means including a cross bar 25 disposed adjacent the rear end of said rear runway section 18; the cross bar 25 projecting, at opposite ends, into arcuate guides 26 mounted on corresponding side frames 6.

The rear runway section is adapted to be actuated between a raised, substantially horizontal position, as in Fig. 2, to a lowered, rearwardly and downwardly inclined position, as in Fig. 1, by means of upstanding, power jacks 27 connected between the floor plate 15 and the cross bar 25.

The rear runway section 18 is normally maintained in its raised position, relieving the jacks 27 of the load, by means of swing brackets 28 which project outwardly in supporting relation to corresponding runways 22. When the rear runway section 18 is to be lowered, the brackets 28 are swung against the corresponding side frames 6 to clear said brackets from the runways 22.

The intermediate runway section 19, to which the rear runway section 18 is hinged, comprises the runways 24 fixed to brackets 29 formed on upstanding, power jacks 30; there being a longitudinally spaced pair of said power jacks 30 for each runway 24. It will be noted that by operation of the power jacks 30, the intermediate runway section 19 may be raised or lowered a substantial distance; the forward end of the rear runway section 18 correspondingly varying in elevation. On one side of the van there is an access door 31 between the upstanding power jacks 30 to permit an operator to enter the van during loading operations, especially when entry through either end of the van would not be convenient.

Figure 10:
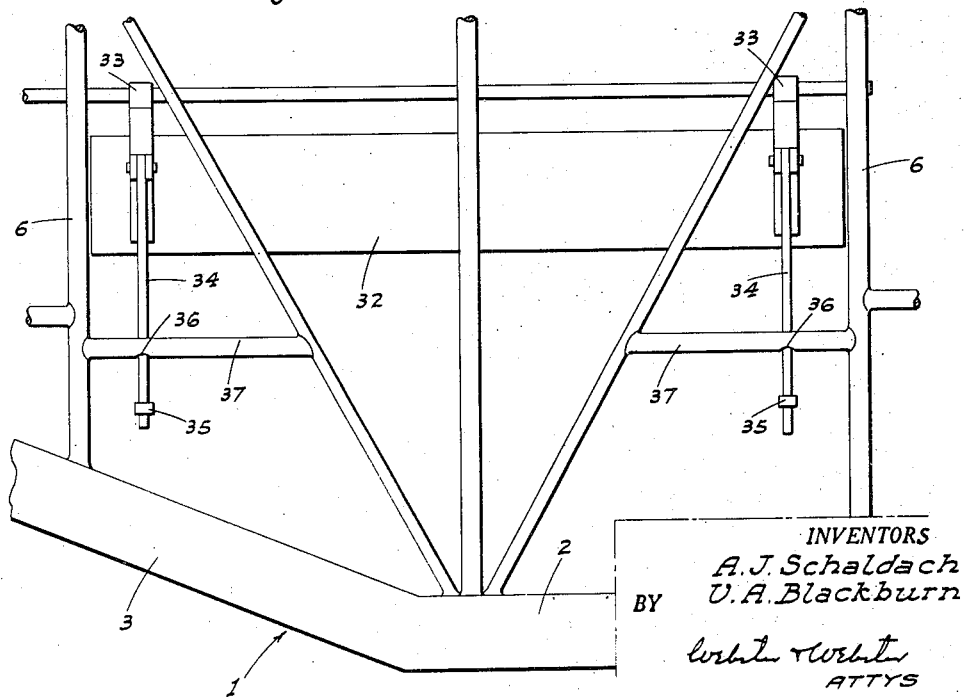
Fig. 10 is a fragmentary side elevation of the structure shown in Fig. 9.

The drop runway section 20 comprises a pair of longitudinally extending, transversely spaced runways 32 hinged to adjacent side frames 6, as at 33, for downward folding movement from a normally raised position, as in Figs. 1 and 9, to a lowered or dropped position, as in Figs. 2 and 10. In their dropped or lowered position the runways 32 lie close to the side frames 6, for the reason which will hereinafter be explained. The runways 32 of the drop runway section 20 are normally maintained in their raised position by stay rods 34 pivoted in connection with the runways 32 adjacent the ends thereof, and extending at a downward and laterally outward incline. Adjacent but short of their lower ends the stay rods 34 are formed with stop collars 35, and below said collars the projecting lower ends of the rods 34 removably extend through bore 36 of horizontal frame members 37 of corresponding side frames 6. To drop the runways 32 the stay rods 34 are merely removed from the bores 36, permitting said runways and rods to fall to their lowered position, as shown in dotted lines in Fig. 9, and in full lines in Fig. 10.

Ahead of the drop runway section 20 the upper deck includes the front runway section 21, which comprises a pair of longitudinally extending, transversely spaced runways 38 normally disposed in raised position, but mounted for drop or lowering movement in the same manner as the runways 32 of the drop runway section 20. The runways 38 are hinged, as at 39, for downward lowering motion, and are maintained in their normal raised position by stay rods 40 removably supported in connection with frame members 40a in the same manner as the stay rods 34.

The above described automobile transport van is loaded in the following manner:

At the outset the rear runway section 18 is lowered by the power jacks 27 until it assumes its downward and rearward incline, as shown in Fig. 1; the intermediate runway section 19, drop runway section 20, and front runway section 21 then being substantially horizontally alined. In this position of the runway sections the vertically adjustable intermediate runway section 19 is in its lowered position. With the rear doors 10 open, a pair of detachable loading rams 41 are connected by hooks 42 with the then lower ends of the runways 22, and bear, at their outer ends, on the ground. Automobile A is then backed up the loading ramps 41 onto the upper deck, and to the forward end of the latter. In this position the rear wheels of automobile A rest on the front runway section 21, while the front wheels rest on the vertically adjustable intermediate runway section 19.

Next, automobile B is run up the loading ramps 41 forwardly, until said automobile is disposed with its front wheels on the vertically adjustable, intermediate runway section 19, and its rear wheels resting on the rear runway section 18. With automobile B in this position the ramps 41 are detached; the power jacks 27 actuated to raise and substantially level the rear runway section 18; and the brackets 28 swung laterally inwardly to support the rear end portion of said rear runway section 18 so that the load may be relieved from the jacks 27.

After the automobiles A and B are loaded onto the upper deck in the manner described, said automobiles are pulled down on their springs, by suitable connection means (not shown) extending from the automobile frames downward to the adjacent runways. This reduces the overall height of said automobiles. Thereafter, the power jacks 30 are operated to raise the runways 24 of the intermediate runway section 19, lifting the adjacent front ends of automobiles A and B on the upper deck. Also, before any automobile is run onto the lower deck the runways 32 of the drop runway section 20 are released and dropped to their lowered position in close relation to corresponding side frames 6.

The loading ramps 41 are then attached to the rear end of the floor plate 15, and automobile C is run up said ramps forwardly onto the lower deck and carried forward in the van until the front wheels of such automobile travel up the incline of the floor plate corresponding to the upwardly offset portion and fall into wheel wells 43 in the floor plate. In this position the front upper portion of the body of automatic C projects upwardly into the space initially occupied by the runways 32 of the drop runway section 20. The reason for dropping these runways 32 is therefore evident. With automobile C thus positioned in the van and suitably anchored against longitudinal movement, the fourth and final automobile D is backed up the ramps 41 and into the van below the then raised rear runway section 18, and is also anchored against longitudinal movement.

When the van has thus been loaded, the ramps 41 are detached, stored at any suitable point in the van, and the rear doors 10 closed.

The four automobiles as thus loaded in the van may be transported from place to place safely, conveniently, and in protective relation against the weather. The automobiles remain clean throughout the entire transport thereof, and arrive in a presentable condition.

To unload the van the above described method of loading is merely reversed.

If the transport van is coupled in trailing relation to a draft truck which likewise includes an automobile receiving body, said body may be loaded directly from the trailing van by running the automobiles through the latter with the front folding doors 11 open, whence the automobiles may pass on transfer runways (not shown) directly into the rear end of the truck body.

For loading into the truck body from the lower deck 13, the runways 32 of the drop runway section 20, as well as the runways 38 of the front runway section 21, are dropped to lowered position, whereby not to obstruct passage of the automobile.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. An automobile transport van comprising an elongated wheel-supported main frame, and an automobile supporting structure on the main frame including upstanding, longitudinal side frames and an upper and lower runway deck mounted between said side frames, each deck being adapted to receive and carry two automobiles in end to end relation; the upper deck including a rear runway section, a front runway section and an intermediate runway section, said runway sections being of a length and disposed so that when two automobiles occupy the upper deck the wheels at adjacent ends rest on the intermediate runway section, the latter being vertically adjustable.

2. An automobile transport van comprising an elongated wheel-supported main frame, and an automobile supporting structure on the main frame including upstanding, longitudinal side frames and an upper and lower runway deck mounted between said side frames, each deck being adapted to receive and carry two automobiles in end to end relation; the upper deck including a rear runway section, a front runway section and an intermediate runway section, said runway sections being of a length and disposed so that when two automobiles occupy the upper deck the wheels at adjacent ends rest on the intermediate runway section, the latter being vertically adjustable, there being a drop runway section interposed in the upper deck between the intermediate and front runway sections in predetermined relation to the position occupied by the foremost automobile on the lower deck.

3. A vehicle transport van comprising an elongated wheel supported main frame having an upwardly offset portion adjacent its forward end, an enclosed body on said main frame, a lower vehicle deck and an upper vehicle deck disposed within the body, the lower deck comprising a runway section extending the full length of the main frame, including the front upwardly offset portion thereof, the length of such runway being such as to accommodate two vehicles end to end, the upper deck comprising a rear runway section, an intermediate runway section, a drop runway section, and a front runway section, the front runway section being disposed adjacent the front end of the body, and the drop runway section being disposed between the front runway section and the intermediate runway section and being of such a length that a vehicle with its wheels on the first part and intermediate runway sections, respectively, will substantially straddle the drop runway section, the latter being collapsible whereby to leave the space between the wheels of such vehicle clear, the relative heights of the upper and lower runways being such that the top of a vehicle on the lower deck with its front wheels on the upwardly offset portion thereof will project into such clear space.

ALVIN J. SCHALDACH.
VIRGIL A. BLACKBURN.

REFERENCES CITED

The following references are of record in the file of this patent:

UNITED STATES PATENTS

| Number | Name | Date |
|---|---|---|
| 1,809,557 | Lishon | June 9, 1931 |
| 1,894,534 | Dolan | Jan. 17, 1933 |
| 1,925,535 | Judd | Sept. 5, 1933 |
| 2,004,439 | Judd | June 11, 1935 |

FOREIGN PATENTS

| Number | Country | Date |
|---|---|---|
| 359,496 | Great Britain | Oct. 23, 1931 |